US010724952B2

(12) United States Patent
Frumker

(10) Patent No.: US 10,724,952 B2
(45) Date of Patent: Jul. 28, 2020

(54) MULTIDIMENSIONAL NANOTOMOGRAPHY WITH HIGH HARMONICS AND ATTOSECOND PULSES

(71) Applicant: B. G. NEGEV TECHNOLOGIES AND APPLICATIONS LTD., AT BEN-GURION UNIVERSITY, Beer Sheva (IL)

(72) Inventor: Evgeny Eugene Frumker, Beer Sheva (IL)

(73) Assignee: B.G. Negev Technologies and Applications Ltd. At Ben-Gurion University, Beer Sheva, IL (US)

( * ) Notice: Subject to any disclaimer, the term of this patent is extended or adjusted under 35 U.S.C. 154(b) by 0 days.

(21) Appl. No.: 16/318,305

(22) PCT Filed: Jul. 18, 2017

(86) PCT No.: PCT/IL2017/050809
§ 371 (c)(1),
(2) Date: Jan. 16, 2019

(87) PCT Pub. No.: WO2018/015952
PCT Pub. Date: Jan. 25, 2018

(65) Prior Publication Data
US 2019/0242819 A1  Aug. 8, 2019

Related U.S. Application Data

(60) Provisional application No. 62/364,907, filed on Jul. 21, 2016.

(51) Int. Cl.
*G01J 3/28* (2006.01)
*G01N 21/63* (2006.01)
(Continued)

(52) U.S. Cl.
CPC ....... *G01N 21/636* (2013.01); *G01N 21/4795* (2013.01); *H01S 3/005* (2013.01);
(Continued)

(58) Field of Classification Search
CPC ............. G01N 21/636; G01N 21/4795; G01N 2021/335; G01N 2021/4797; H01S 3/005; H01S 3/0057; H01S 3/0071; H01S 3/0092
See application file for complete search history.

(56) References Cited

U.S. PATENT DOCUMENTS 5,450,463 A * 9/1995 Iketaki .................... G21K 7/00
378/43
7,729,403 B2   6/2010 Rocca et al.
(Continued)

FOREIGN PATENT DOCUMENTS

CN        203631969        6/2014

OTHER PUBLICATIONS

Loh, Zhi-Heng et al., A tabletop femtosecond time-resolved soft x-ray transient absorption spectrometer, Review of Scientific Instruments, 2008, 79:7, 073101, Jun. 10, 2008.
(Continued)

*Primary Examiner* — Abdullahi Nur
(74) *Attorney, Agent, or Firm* — Snell & Wilmer, L.L.P.

(57) ABSTRACT

A system and method for performing four dimensional multicolor nanotomography with high harmonics and attosecond pulses to attain spectrally resolved absorption data about the three-dimensional volumetric structure of a sample are disclosed. Also disclosed are embodiments of the system and method that have been adapted to perform four dimensional multicolor nanotomography absorption and index of refraction data about the three-dimensional volumetric structure of a sample, to perform five dimensional multi-
(Continued)

color nanotomography with high harmonics and attosecond pulses to obtain spectrally resolved absorption data about the three-dimensional volumetric structure and temporal dynamics of the sample, to perform five dimensional multicolor nanotomography to obtain spectrally resolved absorption and index of refraction data about the three-dimensional volumetric structure and temporal dynamics of the sample, and to perform Fourier-domain Optical Coherence Tomography.

26 Claims, 2 Drawing Sheets

(51) Int. Cl.
  *G01N 21/47* (2006.01)
  *H01S 3/00* (2006.01)
  *G01N 21/33* (2006.01)

(52) U.S. Cl.
  CPC .......... *H01S 3/0057* (2013.01); *H01S 3/0071* (2013.01); *H01S 3/0092* (2013.01); *G01N 2021/335* (2013.01); *G01N 2021/4797* (2013.01)

(56) References Cited

U.S. PATENT DOCUMENTS

2008/0212075 A1 9/2008 Paulus et al.
2012/0154902 A1 6/2012 Boullet et al.

OTHER PUBLICATIONS

International Search Report and Written Opinion issued in PCT/IL2017/050809 dated Oct. 19, 2017.

* cited by examiner

MULTIDIMENSIONAL NANOTOMOGRAPHY WITH HIGH HARMONICS AND ATTOSECOND PULSES

CROSS-REFERENCE TO RELATED APPLICATIONS

This application is a U.S. national phase filing under 35 U.S.C. § 371 of PCT/IL2017/050809 filed on Jul. 18, 2017 and entitled "MULTIDIMENSIONAL NANOTOMOGRAPHY WITH HIGH HARMONICS AND ATTOSECOND PULSES," which claims priority to U.S. Provisional Application No. 62/364,907 filed on Jul. 21, 2016, the disclosures of which are incorporated herein by reference in their entirety.

FIELD OF THE INVENTION

The invention is from the field of optics. Specifically it is from the field of tomography using high harmonic generation (HHG) and attosecond pulses.

BACKGROUND OF THE INVENTION

Publications and other reference materials referred to herein are numerically referenced in the following text and respectively grouped in the appended Bibliography which immediately precedes the claims.

Nanoscience and nanotechnology have attracted unprecedented interest and effort in the past decade from many scientific disciplines, such as physics, chemistry, materials sciences and others, making them into exciting multidisciplinary subjects. Highly multidisciplinary efforts have resulted in substantial progress and a broad spectrum of scientific and technological accomplishments, with many more expected. Nanotechnology is expected to play a pivotal role in the world economy in years to come.

The remarkable progress in nanoscience and nanotechnology has created the need for practical tools capable of resolving and analyzing nanometer scale structures. Analytical and imaging tools that have spatial resolution at the nanometer scale are of paramount importance for both fundamental nanoscience and applied nanotechnology [1]. In fact, any progress in the synthesis and study of novel nanostructures is ultimately related to, and often limited by, our ability to probe and analyze them. However, most imaging and analysis tools in use today are not adequate for addressing these emerging challenges at the nanoscale.

Another scientific frontier that has witnessed explosive progress in the past decade is high harmonic generation (HHG) and attosecond science [2]. The recent spectacular progress in advanced femtosecond laser technology has opened the door to the attosecond world. This allows real-time experimental observation and time domain control of atomic scale electron dynamics in matter. Despite this remarkable progress, several fundamental challenges in attosecond science, some of which will be addressed by the present invention, remain unsolved.

High harmonic generation, being the backbone of attosecond science, possesses a unique combination of properties, not only in the temporal but also in the spectral domain, which could be very attractive in studies of matter at the angstrom and nanoscales. High harmonics' short wavelength, spatial coherence [3] and a broad controllable spectrum makes them extremely interesting in the exploration of nano-structures and nanomaterials.

In recent years, significant effort has been directed towards the development of different types of electron microscopy, which is the main tool used in nanoscience today [4]. Although providing very valuable insight, most of this work is limited to surface (2D) imaging of the nanostructures. XUV and soft x-rays not only complement electron microscopy but also offer new contrast mechanisms for structural imaging and dynamics studies. Many nations have put tremendous effort and financial resources into developing synchrotrons and free electron laser systems (FEL), which are the main sources of XUV and X-ray radiation in use today.

The benchmark resolution (about 15 nm) has been obtained by imaging with 1.52 nm wavelength radiation from a third generation synchrotron light source [1]. The light source used in this experiment was the third generation synchrotron Advanced Light Source (ALS) in Berkeley. In this impressive one hundred million dollar facility, highly accelerated relativistic electrons are "stored" in a 200-meter storage ring, guided by a series of magnets that force them into a curved trajectory. As they travel around the storage ring, the electrons emit synchrotron radiation energy in the form of photons, which is directed by specialized optics down 12-meter long beamlines to experiment terminals.

Another example of an experimental facility capable of nanoscale and atomic imaging is the Linac Coherent Light Source (LCLS) based in the recently upgraded Stanford Linear Accelerator Center (SLAC). This is a free electron laser seeded by the SLAC linear accelerator; it emits hard X-rays, which are about a billion times brighter than the "traditional" synchrotron X-ray sources. The whole "set-up" occupies more than 1.7 square kilometers of land, being more than 3 kilometers long. More than 250 million dollars were required solely of upgrading the SLAC.

Nevertheless, the widespread use of XUV and soft x-ray light for investigating various types of imaging modalities requires the development of compact, so-called table-top systems. High-harmonics generation provides a very attractive source of ultra-short coherent radiation in the deep UV and soft x-ray range of the electromagnetic spectrum and has the inherent advantage that it is practically realizable on a laboratory scale, as opposed to large and very expensive free electron laser and synchrotron facilities.

Recently, several attempts have been made to exploit high harmonics for imaging. In diffractive imaging [5, 6], static, not spectrally resolved, two-dimensional imaging has been demonstrated with a resolution of the order of 100 nm. The technique uses over-sampling of the diffraction pattern with an iterative phase retrieval algorithm. In the so-called "ankylography" modality [7], an attempt has been made to obtain a three dimensional structure of an object from single "2D spherical pattern" that "is sampled at a sufficiently fine scale on the Ewald sphere". Nevertheless, the imaging principles and proposed methodology of "ankylography" were found to be flawed, bringing into question its validity and scope of applicability [8].

In another work, Optical Coherence Tomography [11] was shown to be used with XUV radiation [10-12] that in principle should allow access to depth information from the samples. However, such a straightforward implementation of the visible light OCT approach to the XUV spectral range has significant limitations. First, due to lack of high quality optics (high reflection optical quality (at XUV wavelength) mirrors, beam-splitters, etc., particular focusing optics, it is impractical to get high lateral resolution. In addition, it was found that different harmonics (i.e. different wavelengths) typically have significantly different wavefront curvatures

[13], thus different harmonics can't be focused to the same diffraction limited spot by conventional lens or mirrors.

Progress in nanoscience and nanotechnology as well as in biomedicine and structural biology depends not only on static examination of the surfaces of structures but also on seeing deep inside material structures to identify what they are made of. It is also very important to be able to follow the dynamic processes inside samples of interest so as to understand what electronic, magnetic, optical, chemical and mechanical processes may be in play and to understand their role.

It is therefore a purpose of the present invention to provide a system and method for performing multispectral multidimensional nanotomography with high harmonics and attosecond pulses capable of measuring the spectral properties of a sample.

It is a purpose of the present invention to provide a system and method for performing multispectral multidimensional nanotomography with high harmonics and attosecond pulses capable of providing visualization of temporal processes in a sample.

It is a purpose of the invention to provide a system and method for performing five dimensional multicolor holographic nano-tomography and optical coherence tomography with high harmonics and attosecond pulses.

Further purposes and advantages of this invention will appear as the description proceeds.

SUMMARY OF THE INVENTION

In a first aspect the invention is a system for performing four dimensional multicolor nanotomography with high harmonics and attosecond pulses to attain spectrally resolved absorption data about the three-dimensional volumetric structure of a sample. The system comprises:
  a) a driving source that produces a driving beam of femtosecond laser pulses;
  b) a high harmonics generating medium (HHG), wherein one of i) attosecond pulses and ii) high harmonic pulses are generated, the HHG located inside a vacuum chamber;
  c) focusing optics to focus the driving beam into the high harmonics generating (HHG);
  d) a XUV spectrometer located within the vacuum chamber, the XUV spectrometer configured to spectrally resolve one of an attosecond signal beam and a high harmonic signal beam that is transmitted through a sample located within the vacuum chamber between the HHG medium and an entrance slit of the XUV spectrometer; and
  e) a two dimensional imager configured to detect HHG radiation.

Embodiments of the system can be adapted to attain spectrally resolved absorption and index of refraction data about the three-dimensional volumetric structure of a sample. In these embodiments the system additionally comprises:
  a) a beamsplitter that divides the driving beam into a reference beam and a signal beam; and
  b) a compensation glass plate through which the reference beam passes;
wherein the focusing optics are configured to focus both the reference and signal beams into the high harmonics generating (HHG) medium; and
the XUV spectrometer is configured to spectrally and spatially resolve in the far-field one of an attosecond signal beam and a high harmonic signal beam that is transmitted through a sample located within the vacuum chamber between the HHG medium and an entrance slit of the XUV spectrometer and one of an attosecond reference beam and a high harmonic reference beam that doesn't interact with the sample.

Embodiments of the system can be adapted to perform five dimensional multicolor nanotomography to obtain spectrally resolved absorption data about the three-dimensional volumetric structure and temporal dynamics of the sample. These embodiments of the system additionally comprise:
  a) a beamsplitter configured to divide the driving beam into a pump beam and a probe beam;
  b) Embodiments of the system can be a delay line configured to control the time between the pump beam and the probe beam; and
  c) delivery optics configured to direct the pump beam into the measured sample.

The embodiments of the system adapted to attain spectrally resolved absorption and index of refraction data can be further adapted to perform five dimensional multicolor nanotomography to obtain spectrally resolved absorption and index of refraction data about the three-dimensional volumetric structure and temporal dynamics of the sample. These embodiments of the system additionally comprise:
  a) a beamsplitter configured to divide the driving beam into a pump beam and a probe beam;
  b) a delay line configured to control the time between the pump beam and the probe beam; and
  c) delivery optics configured to direct the pump beam into the measured sample.

All embodiments of the system can be adapted to perform Fourier-domain Optical Coherence Tomography by addition of a folding mirror that is configured to allow the harmonic signal beam to be reflected from the sample before being focused on the entrance slit of the XUV spectrometer.

In all embodiments of the system the two dimensional imager can be one of:
  a) a microchannel plate on which the signal and reference beams fall after being diffracted by a grating in the XUV spectrometer and focusing optics configured to image the backside phosphor screen of the microchannel plate onto a CCD camera or CMOS camera;
  b) an XUV CCD camera; and
  c) a phosphor screen on which the signal and reference beams fall after being diffracted by a grating in the XUV spectrometer and focusing optics configured to image the phosphor screen onto a CCD camera or CMOS camera.

In all embodiments of the system the sample can be one of: a nanostructure, an electronic chip, or a biological target.

All embodiments of the system comprise a stage on which the sample is mounted. The stage is configured to move the sample in the plane perpendicular to the beam propagation and also to rotate the sample.

In all embodiments of the system the grating can be a XUV flat-field grazing incidence grating.

In all embodiments of the system the driving source for harmonic generation can be one of: an 800-nm driving laser and an optical parametric amplifier (OPA). The OPA can have a central wavelength of up to 2600 nm.

In all embodiments of the system the high harmonics generating medium can be one of: gas jets, semi-infinite differential gas cells, gas-filled hollow waveguides with a quasiphase-matched arrangement, and gas-filled hollow waveguides without a quasiphase-matched arrangement.

The embodiments of the system adapted to perform five dimensional multicolor nanotomography can comprise a nonlinear medium within which the pump wavelength is changed. The nonlinear medium can be a beta barium borate (BBO) crystal that doubles the pump wavelength.

In all embodiments of the system the probe beam can be spectrally broadened in a hollow fiber filled with neon and dispersion compensated with chirped mirrors.

In a second aspect the invention is a method for performing four dimensional multicolor nanotomography with high harmonics and attosecond pulses to attain absorption data about the three-dimensional volumetric structure of a sample. The method comprises:

a) activating a driving source to produce a driving beam of femtosecond laser pulses;
b) focusing the driving beam into a high harmonics generating (HHG) medium wherein one of: a) attosecond pulses and b) high harmonic pulses are generated;
c) focusing one of an attosecond signal beam and a high harmonic signal beam that is transmitted through the sample on an entrance slit of a XUV spectrometer;
d) spectrally resolving with the XUV spectrometer a diffraction pattern of one of the attosecond signal beam and the high harmonic signal beam that is transmitted through the sample; and
e) directing the signal beam, after being diffracted by a grating in the XUV spectrometer, onto a two dimensional imager configured to detect HHG radiation;

wherein:
A. if the sample has cylindrical symmetry:
  i) mounting the sample on a stage that is configured to move the sample in the plane perpendicular to the beam propagation;
  ii) scanning the sample in the plane perpendicular to the beam propagation direction and collecting the data;
B. if the sample does not have cylindrical symmetry:
  i) mounting the sample on a stage that is configured to move the sample in the plane perpendicular to the beam propagation and also to rotate the sample;
  ii) rotating the sample;
  iii) for each rotational position, scanning the sample in the plane perpendicular to the beam propagation direction and collecting the data.

Embodiments of the method can be adapted for performing four dimensional multicolor nanotomography to attain absorption and index of refraction data about the three-dimensional volumetric structure of a sample. In these embodiments the method additionally comprises:

i) dividing with a beamsplitter the driving beam into reference and signal beams;
ii) passing the reference beam through a compensation plate;
iii) replacing steps b) through e) with the following steps:
f) focusing both the reference beam and signal beam into a high harmonics generating (HHG) medium wherein one of: a) attosecond pulses and b) high harmonic pulses are generated;
g) focusing on an entrance slit of a XUV spectrometer
  i) one of: a) an attosecond signal beam and b) a high harmonic signal beam that is transmitted through the sample; and
  ii) one of: a) an attosecond reference beam and b) a high harmonic reference beam that does not interact with the sample;
h) spectrally and spatially resolving with the XUV spectrometer in the far-field a diffraction pattern of
  i) one of: a) the attosecond signal beam and b) the high harmonic signal beam that is transmitted through the sample; and
  ii) one of: a) the attosecond reference beam and b) the high harmonic reference beam that does not interact with the sample;
i) directing the coherently superimposed signal and reference beams after being diffracted by a grating in the XUV spectrometer onto a two dimensional imager configured to detect HHG radiation.

Embodiments of the method can be adapted for performing five dimensional multicolor nanotomography with high harmonics and attosecond pulses to obtain absorption data about the three-dimensional volumetric structure and dynamics of the sample and allowing the interplay of phonons, carriers, and magnetic moment dynamics in the sample to be measured allowing visualization of temporal processes taking place in the sample. In these embodiments the method additionally comprises performing the following steps after step a):

x) dividing the driving beam with a beamsplitter into a pump beam and a probe beam;
y) controlling the time between the pump beam and the probe beam with a delay line; and
z) directing with delivery optics the pump beam onto the sample inside the vacuum chamber.

Embodiments of the method adapted to attain spectrally resolved absorption and index of refraction data can be further adapted to perform five dimensional multicolor nanotomography to obtain spectrally resolved absorption and index of refraction data about the three-dimensional volumetric structure and temporal dynamics of the sample. In these embodiments the method additionally comprises performing the following steps after step a):

x) dividing the driving beam with a beamsplitter into a pump beam and a probe beam;
y) controlling the time between the pump beam and the probe beam with a delay line;
z) directing with delivery optics the pump beam onto the sample inside the vacuum chamber; and All embodiments of the method can be adapted to perform Fourier-domain Optical Coherence Tomography by reflecting the harmonic signal beam from the sample before focusing the harmonic signal beam on the entrance slit of the XUV spectrometer.

In the embodiments of the system adapted to perform five dimensional multicolor nanotomography the pump wavelength can be changed by a nonlinear medium.

In the embodiments of the method adapted to attain both absorption and index of refraction data, both phase and amplitude are measured next to the sample by using the Fresnel-Kirchhoff diffraction formula to computationally back propagate the spectrally resolved harmonic signal beam onto the sample, thereby increasing the resolution.

In the embodiments of the method adapted to attain only absorption data, a Radon transform can be applied separately to the absorption data for each color, thereby facilitating three dimensional spatial and one dimensional spectral reconstruction of absorption and index of refraction of the sample.

In the embodiments of the method adapted for performing four dimensional multicolor nanotomography to attain both absorption and index of refraction data a Radon transform can be applied separately to the absorption data and to the phase data for each color, thereby facilitating three dimensional spatial and one dimensional spectral reconstruction of both absorption and index of refraction of the sample.

The embodiments of the method adapted to attain both absorption and index of refraction data can be used for full characterization of the phase and amplitude of the wavefront of the spectrally resolved reference and signal beams by using the Spectral Wavefront Optics Reconstruction by Diffraction (SWORD)method. The SWORD method comprised:
  a) producing XUV radiation in generating medium;
  b) diffracting the XUV radiation through a horizontal scanning slit;
  c) directing the XUV radiation that has passed through the horizontal scanning slit to impinge onto the entrance slit of an XUV spectrometer, wherein the XUV spectrometer is constructed to resolve the spectrum in one direction (horizontal) and to allow essentially free-space field propagation in the other (vertical);
  d) directing a vertically diffracted sample of the incoming wavefront to pass through an entrance slit of the XUV spectrometer;
  e) taking two dimensional images for each position of the scanning slit, thereby producing a diffractogram; and
  f) determining the wavefront slope of the sampled wavefront slice, which is proportional to the relative vertical position of the diffraction pattern's centroid, thereby reconstructing the waveform by analyzing the measured diffractogram. wherein the amplitude at each sampling point is determined by the integral intensity of the corresponding diffraction pattern in the diffractogram.

The embodiments of the method adapted to attain both absorption and index of refraction data can be used for recording of a spectral hologram of a spectrally resolved diffraction pattern of the reference beam superimposed with a spectrally resolved diffraction pattern of the signal beam on the two dimensional imager, wherein the spectral hologram is express as:

$$I(\vec{r}_{mcp}, \omega) = \|E_s(\vec{r}_{mcp}, \omega)| \exp[-i\phi_s(\vec{r}_{mcp}, \omega)] +$$
$$|E_r(\vec{r}_{mcp}, \omega)| \exp[-i\phi_r(\vec{r}_{mcp}, \omega)]\|^2$$
$$= |E_s(\vec{r}_{mcp}, \omega)|^2 + |E_s(\vec{r}_{mcp}, \omega)|^2 +$$
$$2|E_s(\vec{r}_{mcp}, \omega)E_r(\vec{r}_{mcp}, \omega)|\cos[\phi_r(\vec{r}_{mcp}, \omega) -$$
$$\phi_r(\vec{r}_{mcp}, \omega)]$$

These embodiments can be used to determine the complete reconstruction of the phase and amplitude for each spectral component of the signal beam diffracted from the sample in the two dimensional imager plane. The method on these embodiments comprised:
  a) determining the full characterization of the reference beam;
  b) measuring the spectral hologram;
using the full characterization of the reference beam and the spectral hologram to carry out a reconstruction process used in computed holography.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

Figure 1:
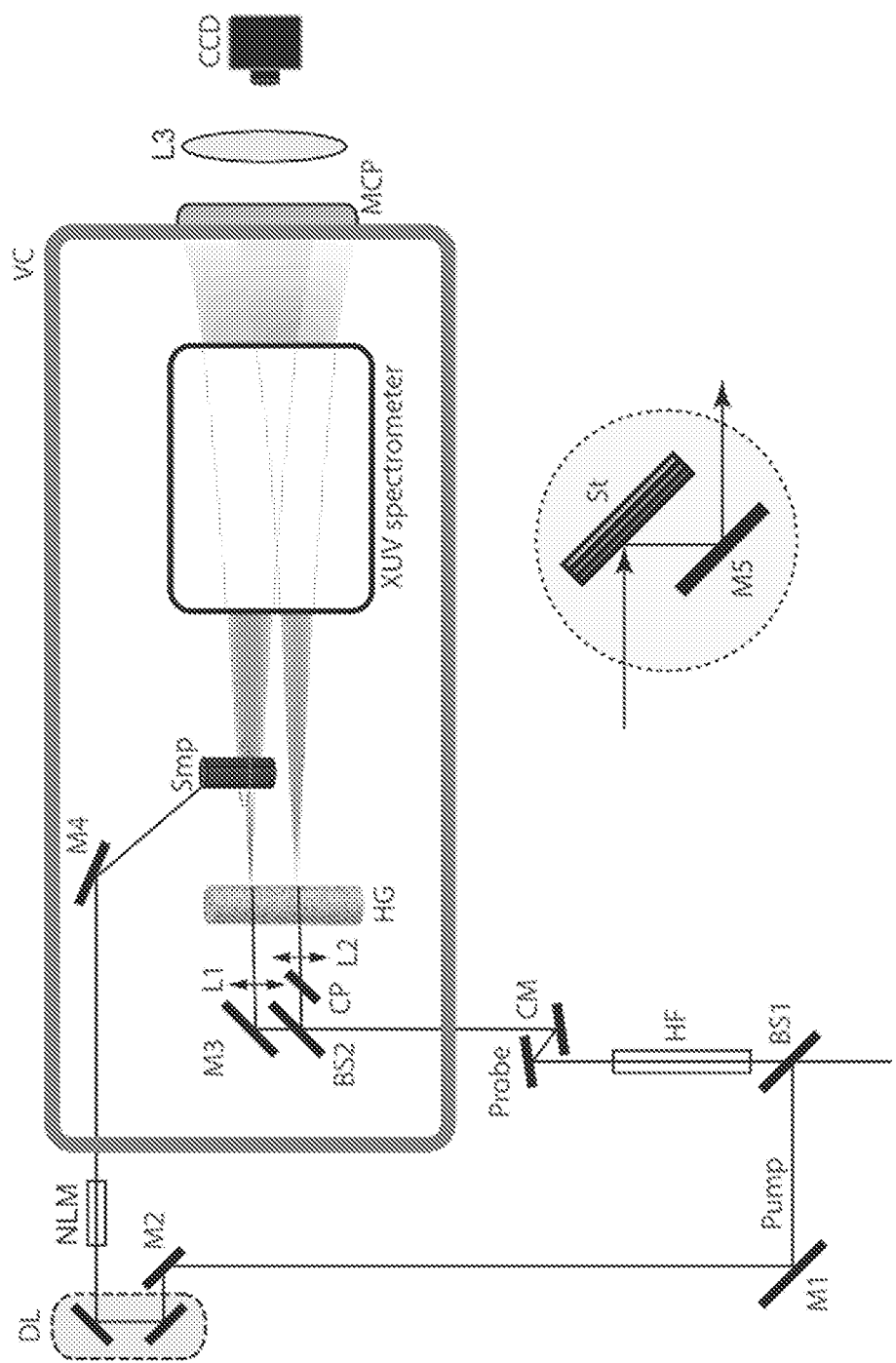
FIG. 1 schematically shows an embodiment of the system of the invention.

FIG. 1 schematically shows an embodiment of the system of the invention. A driving femtosecond laser pulse (LP)—about 30 fsec duration—is divided by a beamsplitter (BS1) into pump and probe arms. The time between pump and probe beam is controlled by a delay line (DL). The pump wavelength can optionally be converted within a nonlinear medium (NLM), for example doubled with a beta barium borate (BBO) crystal. Mirrors M1, M2, and M4 symbolically represent optical elements used to direct the pump beam from beamsplitter (BS1) onto the sample (Smp).

The probe beam is optionally spectrally broadened in a hollow fiber (HF) filled with gas (for example: neon) and dispersion compensated with chirped mirrors (CM) to about 5 fsec. The probe beam enters a vacuum chamber (VC) and is divided by a beamsplitter (BS2) into reference and signal beams. The reference beam passes through a compensation glass plate (CP). The signal beam is directed by mirror M3 in the direction of the generating medium (HG). Both beams are focused by optical elements symbolically shown as L1 and L2 and generate attosecond pulses within the generating medium (HG). (It is noted that in embodiments of the system some or all of the components BS2, CP, M3, L1, L2, and M4 can be located outside of the vacuum chamber VC.) The harmonic signal beam is transmitted through the sample (Smp), which can be a nanostructure, electronic chip or a biological target and the resulting diffraction pattern is spectrally and spatially resolved in the far-field by using a flat field XUV spectrometer. The attosecond pulse generated in the reference beam propagates through the same spectrometer, but without interaction with the sample. The sample is mounted on a stage that can move the sample in the plane perpendicular to the beam propagation and also rotate the sample. This facilitates measurement of a specific sample area as well as collection of the complete tomographic data set.

XUV radiation produced in the high-harmonics generating source (HG) impinges onto the entrance slit of the XUV spectrometer positioned as seen in FIG. 1. The signal and reference beams pass through the spectrometer slit and impinge on a diffraction grating and the diffracted beams are detected by a two dimensional imager configured to detect HHG radiation. In the embodiment shown in FIG. 1 the beams diffracted by the grating fall on a microchannel plate (MCP) whose backside phosphor screen is imaged by lens L3 onto a CCD camera or CMOS camera. In other embodiments the imager is a phosphor screen imaged by focusing optics onto a CCD or CMOS camera or the imager is a XUV CCD camera.

Using the system as shown in FIG. 1 in which the XUV spectrometer is a flat field grazing incidence spectrometer five dimensional (i.e. three dimensional spatial dimensionality+one dimensional independent frequency information+one dimendional time evolution with attosecond resolution) multicolor holographic nanotomography with high harmonics and attosecond pulses, with particular emphasis on three-dimensional volumetric structural analysis and dynamics.

The same basic system without BS1 and the components of the pump arm can be used to obtain four dimensional (i.e. three dimensional spatial dimensionality+one dimensional independent frequency information) multicolor holographic nanotomography with high harmonics and attosecond pulses.

Another embodiment of the system comprises neither BS1 and the components of the pump arm nor the components of the reference beam (BS2, CP, and L2), i.e. this embodiment of the system comprises only the probe beam. This embodiment can be used to obtain spectrally resolved and dimensional information at a lower resolution than with the system that comprises a reference beam. Using this embodiment of the system the Radon or Abel tomographic technique described herein below can be applied to absorption data only.

Fourier-domain Optical Coherence Tomography (OCT) [9] with high harmonics generation sources can also be carried out using the system of FIG. 1. One of the main experimental challenges in the use of XUV and soft X-rays stems from the fact that most materials are very absorptive in this spectral range. Therefore, it is impossible to make even the basic optical elements, such as, for example, a beam-splitter, which is a key element in the conventional OCT concept [9] that has been demonstrated to date.

To overcome this problem, in the system of FIG. 1 the fundamental probe beam is split at the beam-splitter (BS2) and not the high-harmonic beam. In preliminary experiments carried out by the inventor, it was shown that the coherence of the beam is preserved in the high harmonic generation process, so that the signal and the reference beams exiting from the generating medium can be used for OCT. For carrying out OCT measurements, the transmissive sample (Smp) is replaced with a reflective structure (St) and a mirror (M5), as shown in the insert in FIG. 1. Then, the diffracted beam from the sample and the reference beam will both go through the flat field spectrometer and be superimposed in the far field. The optical coherence tomography data will be retrieved from this spectrally analyzed far field interference pattern.

The current state-of-the art OCT reaches a best depth resolution of ~2μ. In the OCT scheme, the depth $-l_{depth}$ and the lateral $-l_{lat}$ resolutions are decoupled from each other and are given by:

$$l_{depth} = \frac{2\ln 2}{\pi} \frac{\lambda_0}{\Delta\lambda} \text{ and } l_{lat} = \frac{\lambda_0}{NA}$$

respectively, where $\lambda_0$ is the central wavelength, $\Delta\lambda$ is the spectral bandwidth of the high harmonic pulse and NA is the numerical aperture of the focusing optics.

The typical bandwidth $\Delta\lambda$ of the high harmonics and attosecond pulses that can be routinely generated in the table-top HHG systems is three orders of magnitude wider than the bandwidth of the best optical source used for OCT today. This provides the potential for achieving a nanometer depth resolution, which the inventor aims to reach with the system and method of the invention. The wide controllable bandwidth of the harmonics will also translate into a wealth of useful information for the proposed 5D multicolor nanotomography. The lateral resolution $l_{lat}$ is also significantly improved, because the wavelength $\lambda_0$ and consequently the diffraction limit is about 2 orders of magnitude better for HHG than for the light typically used in the modern OCT systems. High-harmonics generation provides highly coherent radiation as compared to typically incoherent radiations produced by synchrotrons. The coherence of the source is critical to the advanced imaging modalities of the invention, as it allows the radiation to be fully characterized and focused into the smallest physically possible (diffraction limited) spot without significant loss of energy, thereby significantly increasing resolution and light utilization efficiency. Preliminary results obtained by the inventor show that coherent XUV photon flux of ~10 nJ at 1 KHz is sufficient and at the same time is below the damage threshold of most nano- and bio-samples.

The performance of the grating is critical for the success of the invention. The inventor has used an XUV spectrometer based on a one of a kind XUV flat-field grazing-incidence grating (Hitachi model 001-0266) in several recent studies [13, 14] and has found its performance suitable for use with this invention also. The imaging properties of this diffraction grating were studied in detail by Nakano et al. in [17]. Based on their work, the inventor estimated, and then confirmed experimentally, the resolution of the spectrometer to be 0.25 nm. The spectrometer is constructed to resolve the spectrum in one direction (horizontal) and to allow essentially free-space field propagation in the other (vertical).

The driving source for harmonic generation in both multidimensional nanotomography and high harmonic coherence tomography can be, for example, a 800-nm driving laser or an optical parametric amplifier (OPA). The use of OPA (with up to 2600 nm central wavelength) instead of an 800 nm source will bring several substantial enhancements to the invention. The ponderomotive energy of recollision electrons, and as a consequence the cut-off frequency of the generated harmonics, is proportional to $\lambda^2$, where $\lambda$ is the fundamental wavelength of the driving laser. Hence, use of OPA allows the generated harmonic bandwidth to be broadened by about an order of magnitude. Using such a broad bandwidth allows exploration of the impact of a much wider high-harmonic spectrum for the image formation and further increases the resolution in the imaging modalities.

One of the very interesting spectral regions that can be reached with the OPA source is the so-called "water window". This spans from the absorption edge of oxygen at a wavelength of 2.3 nm to the absorption edge of carbon at 4.4 nm. Water is transparent at these wavelengths, while most elements found in biological samples of interest are absorbing. Hence, hydrated unstained biological samples can be studied in their natural aqueous environment. Both multidimensional imaging and harmonic coherence tomography of biological samples can be performed in this spectral region using OPA and the system of FIG. 1.

An additional distinct advantage of using OPA is its remarkable capability of passive carrier envelope phase (CEP) stabilization [22], with the prospect of generation of close to a single cycle femtosecond pulses. Using such a source, isolated attosecond pulses can be generated. Such isolated attosecond pulses [23] enable the generation of a very broad quasi-continuum spectrum in the XUV and soft X-ray spectral regions as well as improvement of pump/probe dynamics studies at the attosecond time scale and further enhances the imaging modalities.

Several HHG sources have been developed in recent years fueled by the demands in attosecond science. Among the most common sources that can be used in the system of FIG. 1 are gas jets, semi-infinite differential gas cells [18], and gas-filled hollow waveguides [19] with or without the quasiphase-matched arrangement [20]. Particular emphasis in choosing the source should be given to improving the conversion efficiency, control of bandwidth, and resulting beam quality of HHG.

The data is collected at each incremental step of the sample's rotational position. In this way, a complete (spectrally resolved phase and amplitude) tomographic data set is collected, carrying fundamental information about 3D spatial+1D spectral properties of the sample (biological sample or the nanostructure).

The capabilities of the system and method are further extended to study the interplay of phonons, carriers and magnetic moments dynamics in the samples, by combining the technique with a pump-probe scheme as shown in FIG. 1, leading to the attosecond time-scale resolution and achieving the (3D spatial+1D spectral+1D time) tomographic data sets.

Applying a pump-probe approach to the system as shown in FIG. 1, makes it possible not only to volumetrically image the sample but also to gain physical insight into the phonon dynamics (mechanical vibrations on the quantum level) and the electron dynamics in the nanostructures in three dimensions. Accurately controlling the time delay between pump and probe pulses leads to important information about the quantum vibrational modes and excitation/relaxation dynamics of the charge carriers and magnetic moments in the nanostructures. These fundamental aspects are of significant importance for understanding underlying physics on the nanoscale.

The extended dynamic range harmonic imaging method that has been described and successfully applied for measuring harmonics with oriented molecules in a paper co-authored by the inventor [16] is used to accurately measure a very broad dynamic range of intensities (4-5 orders of magnitude) in the diffraction pattern in a linear regime without distortions. This critical enabling technology is capable of about 2 orders of magnitude increase in the dynamic range of the imaging with a MCP detector.

The reference and signal beams are fully characterized using the Spectral Wavefront Optics Reconstruction by Diffraction (SWORD) approach, which has recently been demonstrated in a paper, in which the inventor of the present invention is a leading co-author [14]. SWORD allows the most complete spatial characterization of an attosecond pulse—both the spectrally resolved phase and amplitude measurements—at every point across the generated beam (the so called spectral wavefronts).

Figure 2:
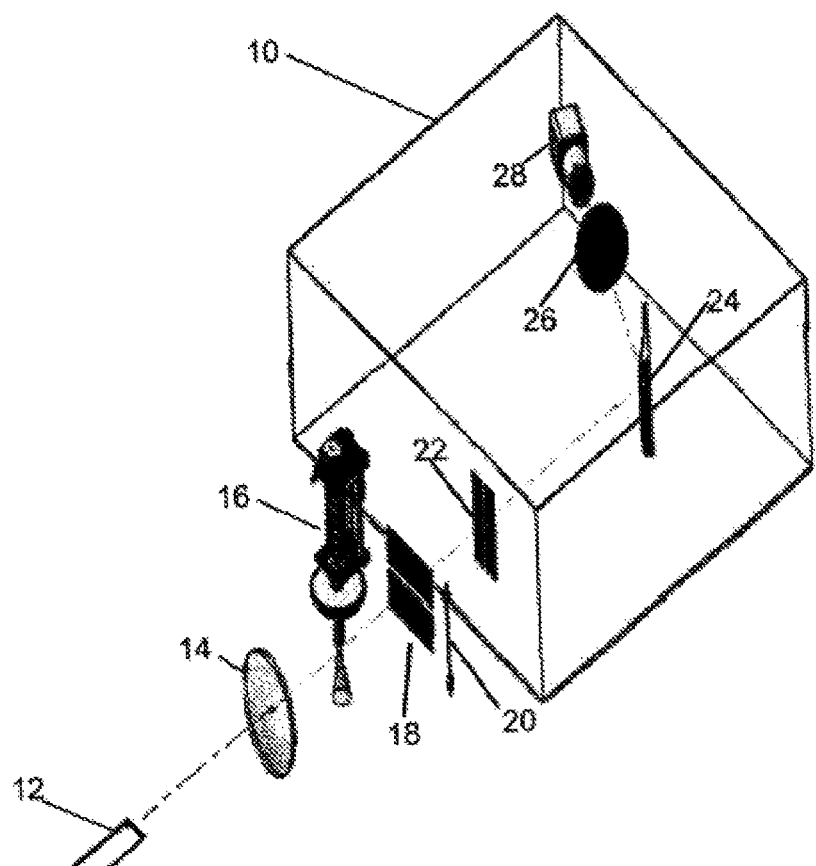
FIG. 2 schematically shows an embodiment of the system of FIG. 1 adapted to carry out the SWORD method.

The SWORD method is carried out using a system that includes a small modification to the one shown in FIG. 1. The modified system is schematically shown in FIG. 2.

In a brief outline the SWORD method operates in the following way (Referring to FIG. 2): XUV radiation produced from driving femtosecond laser (12) radiation focused (14) into a generating medium (16) is diffracted through a horizontal scanning slit (18) (arrow 20 indicates the scanning direction) and then impinges onto the entrance slit (22) of an XUV spectrometer (10). The vertically diffracted sample of the incoming wavefront passes through the spectrometer slit (22). The spectrometer is constructed to resolve the spectrum in one direction (horizontal) and to allow essentially free-space field propagation in the other. Two dimensional images are taken using an XUV imager (in the figure a microchannel plate (26) and CCD/CMOS camera (28)) for each position of the scanning slit (18), producing what the inventor calls a diffractogram. The relative vertical position of the diffraction pattern's centroid is proportional to the wavefront slope of the sampled wavefront slice. Thus analyzing the measured diffractogram the waveform can be reconstructed. The amplitude at each sampling point is determined by the integral intensity of the corresponding diffraction pattern in the diffractogram.

The spectrally resolved diffracted pattern in the far field of the signal beam $$|E_s(\vec{r}_{mcp},\omega)|\exp[-i\phi_s(\vec{r}_{mcp},\tilde{\omega})]$$

projected on the 2D XUV imaging detector (for example imaging micro-channel plate (MCP)) will be superimposed with the harmonic beam from the reference arm $$|E_r(\vec{r}_{mcp},\omega)|\exp[-i\phi_r(\vec{r}_{mcp},\omega)].$$

Here $-|E|$ is the spectral amplitude of the field and $\phi$ is the phase of the complex field E, and $\vec{r}_{mcp}$ is the position vector in the plane of the 2D XUV imaging detector.

In this way, the interference pattern (which is, in fact, a spectrally resolved "hologram") $I(\vec{r}_{mcp})$ of the signal and the reference beam will be recorded on the 2D XUV imager:

$$I(\vec{r}_{mcp},\omega) = \left\| E_s(\vec{r}_{mcp},\omega) \right| \exp[-i\phi_s(\vec{r}_{mcp},\omega)] + \tag{1}$$
$$\left| E_r(\vec{r}_{mcp},\omega) \right| \exp[-i\phi_r(\vec{r}_{mcp},\omega)] \right\|^2$$
$$= \left| E_r(\vec{r}_{mcp},\omega) \right|^2 + \left| E_s(\vec{r}_{mcp},\omega) \right|^2 + \tag{2}$$
$$2\left| E_s(\vec{r}_{mcp},\omega) E_r(\vec{r}_{mcp},\omega) \right| \cos[\phi_s(\vec{r}_{mcp},\omega) - \phi_r(\vec{r}_{mcp},\omega)]$$

Following the characterization of the beam in the reference arm, the spectral hologram will facilitate complete reconstruction of the signal beam (phase and amplitude for each spectral component) diffracted from the sample in the MCP plane, similar to the reconstruction process used in computed holography.

The starting point for the theoretical part of the invention is existing tomography modalities, such as projection tomography [21] and optical coherence tomography [9]. The system of FIG. 1 enables collection of both spectral and spatial (diffraction) information after interaction of the attosecond pulse beam with a nanostructure or a biological sample. The basic theory of tomography is extended to take advantage of the complete (phase and amplitude) reconstruction of tomographic data for each frequency component in an extremely broad and controllable spectrum of the XUV source. It is important to note that having reconstructed the complex harmonic field $$|E_s(\vec{r}_{mcp})|\exp[-i\phi_s(\vec{r}_{mcp})]$$

in the 2D XUV imaging detector plane, it can be found across any plane along using the Fresnel-Kirchhoff diffraction formula for each harmonic:

$$E_s(\vec{r}_0) = \frac{1}{i\lambda} \int\!\!\int_\Sigma E_s(\vec{r}_{mcp}) \frac{\exp[ik|\vec{R}_{0mcp}|]}{|\vec{R}_{0mcp}|} \cos\theta ds_{mcp} \tag{3}$$

Here, $\vec{r}_{mcp}$, $\vec{r}_0$ are the position vectors in the plane of the 2D XUV imaging detector and any arbitrary plane of interest along the propagation direction respectively; $\vec{R}_{0mcp}$ is the radius vector connecting the point $\vec{r}_{mcp}$ in the MCP plane and the point $\vec{r}_0$ in the plane of interest; $k=2\pi/\lambda$, where $\lambda$ is the harmonic's wavelength; $\theta$ is an angle between a normal to the MCP's plane and $\vec{R}_{0mcp}$; and $\Sigma$ is the 2D XUV imaging detector's integration area.

The complex field for each harmonic is projected to the near field region of the sample. Thus, unprecedented detailed information about the target's absorption and refractive index along the sample, carried by the diffracted harmonic beam is gained. The data is collected for a multitude of rotational positions of the sample for each rotational position, the sample is scanned in the plane perpendicular to the beam propagation direction and the data is collected. If the sample has cylindrical symmetry then no rotation of the sample is required and the sample is scanned in the plane perpendicular to the beam propagation direction and the data is collected. At this point the conventional tomography technique [21] using Radon transform (for a non-symmetric sample or Abel transform in the case of a symmetric, e.g. cylindrical, sample) is applied separately to the absorption data and to the phase (refractive index) data for each color.

The method and system of the invention provides the level of spatial three dimensional (nanometer scale) and, at the same time, temporal (tens of attoseconds) resolution that is not available at present. This new capability will have a significant impact across several scientific fields and pave the way for new discoveries in nanoscience, nanotechnology, electronics, biomedicine and structural biology.

One specific example of the applicability of the invention is the study of ultrafast dynamic properties of the multilevel 3D magnetic materials.

Hitherto most of the advances in magnetic storage have been fundamentally limited to planar geometry and thus eventually restricted by the superparamagnetic limit in two dimensions. Examples of such a 2D approaches include bit-patterned data storage media, exploiting giant magnetoresistance, heat-assisted magnetic recording (HAMR), and all-optical magnetization flipping.

To achieve a real breakthrough over the superparamagnetism limit, the ultimate solution is to move beyond incremental 2D improvements—to the third dimension. Some exciting efforts in this direction have recently been reported in 3D patterned magnetic material as well as in ongoing research on magnetic nanoparticle self assemblies. In addition to the 3D nanometer scale spatial resolution, the storage technologies of the future will require pushing the speed of magnetic state manipulation to its ultimate limits.

In addition to storage applications, magnetic nanoparticles are very promising candidates for biomedical applications. For example, FePt nanoparticles have a wide range of magnetic properties and are chemically very stable. These nanoparticles have been functionalized with mercaptoalkanoic acids and utilized as an effective agent to bind proteins, forming a conjugate that could be used for instant and sensitive detection of pathogens at ultralow concentrations.

Yet, a full fundamental understanding of the three dimensional magnetization dynamics of the "voxels" (the term "voxel" describes an elementary volume in three dimensions in analogy to the term "pixels" describing the elementary area in two dimensions) at the nanoscale that is governed by intricate interplay between electrons, spins, phonons and photons on the ultrafast (attosecond-to-femtosecond) time scales remains an unsolved challenge for both theory and experiment. Some important experimental work has been done to address the questions of ultrafast magnetic dynamics. However, it has been limited to the one or two dimensional measurements, without providing the required 3D resolution. Even at this reduced dimensionality, some controversy and unsolved questions remain open.

The dynamic multidimensional nanotomography made possible by the present invention is ideally suited to experimentally investigating ultrafast 3D magnetization dynamics of the magnetic materials at the nanoscale, thereby paving the way for technological progress not only in 3D magnetic storage, but also in biomedical applications. In fact, the method provides significantly improved spatial and temporal resolution over the conventional—visible, UV or near IR—pump/probe optical techniques. Measuring and topographically reconstructing the complete HHG spectrum at each nanovoxel will different contrast mechanisms to be employed in the measurements. In particular, the magnetic birefringes of the M edge can be used, which will allow differentiation between specific magnetic elements in the measurements (for example, Co can be told apart from Fe in the 3D sample).

Among the fundamental physical questions that can be addressed are: How fast can the magnetization of the voxels be reoriented in the host matrix? How do the speed and magnetic properties depend on the voxel size and geometry? What processes pose the fundamental limits to the voxel's size, shape and the dynamics? How efficient is the photon field coupling to the magnetic nanoparticle and how this coupling is influenced by the nanoparticle shape? What is the shape/size dependent leading mechanism that drives the change of magnetization—is it mediated by spin-orbit? What is the role of phonons, impurities, magnons and the Coulomb exchange interaction in the spin-flip processes?

It is important to stress that the invention provides several key advantages over conventional tomographic techniques:

In contrast to conventional tomography, both the phase and the amplitude of the diffracted beam are measured in the far field for each frequency component. This allows the field to be propagated back on the sample using the Fresnel-Kirchhoff (Eq. 3) theorem. This means that a significant increase in resolution of the reconstruction is achieved, as the resolution is not limited by the numerical aperture of the focusing. The theoretical analysis shows better than 10 nm of the potential "voxel" resolution, given realistic experimental conditions.

The fact that spatial and spectrally resolved phases are measured enables reconstruction not only of the volumetric absorption of the sample, but also the distribution of the refractive index in space as a function of the wavelength. This is an additional contrast mechanism that will generate new significant information about the target samples.

High harmonics are generated in a very broad coherent spectrum. This translates into exceptionally broad dynamic volumetric information from the reconstructed tomographic data. It provides an unprecedented amount of data in space and time about the target nano- and biological samples, previously inaccessible by any available technique.

Although embodiments of the invention have been described by way of illustration, it will be understood that the invention may be carried out with many variations, modifications, and adaptations, without exceeding the scope of the claims.

BIBLIOGRAPHY

[1] W. L. Chao, B. D. Harteneck, J. A. Liddle, E. H. Anderson, and D. T. Attwood. Soft X-ray microscopy at a spatial resolution better than 15 nm. *Nature*, 435(7046): 1210-1213, Jun. 30, 2005.

[2] M. Hentschel, R. Kienberger, Ch. Spielmann, G. A. Reider, N. Milosevic, T. Brabec, P. Corkum, U. Heinzmann, M. Drescher, and F. Krausz. Attosecond metrology. *Nature*, 414(6863):509-513, Nov. 29, 2001.

[3] R. A. Bartels, A. Paul, H. Green, H. C. Kapteyn, M. M. Murnane, S. Backus, I. P. Christov, Y. W. Liu, D. Attwood, and C. Jacobsen. Generation of spatially coherent light at extreme ultraviolet wavelengths. *Science*, 297(5580):376-378, Jul. 19, 2002.

[4] U. Kemiktarak, T. Ndukum, K. C. Schwab, and K. L. Ekinci. Radio-frequency scanning tunnelling microscopy. *Nature*, 450(7166):85-88, 2007.

[5] R. L. Sandberg, A. Paul, D. A. Raymondson, S. Ha¨drich, D. M. Gaudiosi, J. Holtsnider, R. I. Tobey, O. Cohen, M. M. Murnane, and H. C. Kapteyn. Lensless diffractive imaging using tabletop coherent high-harmonic soft-x-ray beams. *Phys. Rev. Lett.*, 99(9):98103, 2007.

[6] A. Ravasio, D. Gauthier, F. R. N. C. Maia, M. Billon, J-P. Caumes, D. Garzella, M. Ge´le´oc, O. Gobert, J-F. Hergott, A-M. Pena, H. Perez, B. Carre´, E. Bourhis, J. Gierak, A. Madouri, D. Mailly, B. Schiedt, M. Fajardo, J. Gautier, P. Zeitoun, P. H. Bucksbaum, J. Hajdu, and H. Merdji. Single-shot diffractive imaging with a table-top femtosecond soft x-ray laser-harmonics source. *Phys. Rev. Lett.*, 103:028104, July 2009.

[7] K. S. Raines, S. Salha, R. L. Sandberg, H. Jiang, J. A. Rodr´iguez, B. P. Fahimian, H. C. Kapteyn, J. Du, and J. Miao. Three-dimensional structure determination from a single view. *Nature*, 463(7278):214-217, 2009.

[8] G. Wang, H. Yu, W. Cong, and A. Katsevich. Non-uniqueness and instability of ankylography. *Nature*, 480 (7375):E2-E3, 2011.

[9] D. Huang, E. Swanson, C. Lin, J. Schuman, W. Stinson, W. Chang, M. Hee, T. Flotte, K. Gregory, C. Puliafito, and J. Fujimoto. Optical Coherence Tomography. *Science*, 254(5035):1178-1181, Nov. 22, 1991.

[10] Silvio Fuchs, Alexander Blinne, Christian Rodel, Ulf Zastrau, Vinzenz Hilbert, Martin Wu¨nsche, Jana Bierbach, E Frumker, E Forster, and G G Paulus. Optical coherence tomography using broad-bandwidth xuv and soft x-ray radiation. *Applied Physics B*, 106(4):789-795, 2012.

[11] Silvio Fuchs, Christian Rodel, Alexander Blinne, Ulf Zastrau, Martin Wunsche, Vinzenz Hilbert, Leif Glaser, Jens Viefhaus, Eugene Frumker, Paul Corkum, et al. Nanometer resolution optical coherence tomography using broad bandwidth xuv and soft x-ray radiation. *Scientific reports*, 6, 2016.

[12] G. G. Paulus and C. Rodel. Short-wavelength coherence tomography, Feb. 2, 2010. U.S. Pat. No. 7,656,538.

[13] E. Frumker, G. G. Paulus, H. Niikura, A. Naumov, D. M. Villeneuve, and P. B. Corkum. Order-dependent structure of high harmonic wavefronts. *Opt. Express*, 20(13): 13870-13877, June 2012.

[14] E. Frumker, G. G. Paulus, H. Niikura, D. M. Villeneuve, and P. B. Corkum. Frequency-resolved high-harmonic wavefront characterization. *Opt. Lett.*, 34(19):3026-3028, Oct. 1, 2009.

[15] D. R. Austin, T. Witting, C. A. Arrell, F. Frank, A. S. Wyatt, J. P. Marangos, J. W. G. Tisch, and I. A. Walmsley. Lateral shearing interferometry of high-harmonic wavefronts. *Opt. Lett.*, 36(10):1746-1748, May 2011.

[16] E. Frumker, C. T. Hebeisen, N. Kajumba, J. B. Bertrand, H. J. Wörner, M. Spanner, D. M. Villeneuve, A. Naumov, and P. B. Corkum. Oriented rotational wavepacket dynamics studies via high harmonic generation. *Phys. Rev. Lett.*, 109(11):113901, 2012.

[17] N. Nakano, H. Kuroda, T. Kita, and T. Harada. Development of a flat-field grazing-incidence xuv spectrometer and its application in picosecond xuv spectroscopy. *Applied Optics*, 23(14):2386-2392, 1984.

[18] J. Sutherland, E. Christensen, N. Powers, S. Rhynard, J. Painter, and J. Peatross. High harmonic gener-ation in a semi-infinite gas cell. *Opt. Express*, 12(19):4430-4436, September 2004.

[19] A. Rundquist, C. G. Durfee, Z. H. Chang, C. Herne, S. Backus, M. M. Murnane, and H. C. Kapteyn. Phase-matched generation of coherent soft X-rays. *SCIENCE*, 280(5368):1412-1415, May 29, 1998.

[20] E. A. Gibson, A. Paul, N. Wagner, D. Gaudiosi, S. Backus, I. P. Christov, A. Aquila, E. M. Gullikson, D. T. Attwood, M. M. Murnane, and H. C. Kapteyn. Coherent soft x-ray generation in the water window with quasi-phase matching. *Science*, 302(5642):95-98, 2003.

[21] M. Born and E. Wolf. *Principles of optics: electromagnetic theory of propagation, interference and diffraction of light*. Cambridge University Press, 1999 pp. 217-227.

[22] C. Vozzi, F. Calegari, E. Benedetti, S. Gasilov, G. Sansone, G. Cerullo, M. Nisoli, S. De Silvestri, and S. Stagira. Millijoule-level phase-stabilized few-optical-cycle infrared parametric source. *Opt. Lett.*, 32(20):2957-2959, 2007.

[23] G. Sansone, E. Benedetti, F. Calegari, C. Vozzi, L. Avaldi, R. Flammini, L. Poletto, P. Villoresi, C. Al-tucci, R. Velotta, S. Stagira, S. De Silvestri, and M. Nisoli. Isolated single-cycle attosecond pulses. *Science*, 314 (5798):443-446, 2006.

The invention claimed is:

1. A system for performing four dimensional multicolor nanotomography with high harmonics and attosecond pulses to attain spectrally resolved absorption data about the three-dimensional volumetric structure of a sample, the system comprising:
   a) a driving source that produces a driving beam of femtosecond laser pulses;
   b) a high harmonics generating medium (HHG), wherein one of i) attosecond pulses and ii) high harmonic pulses are generated, the HHG located inside a vacuum chamber;
   c) focusing optics to focus the driving beam into the high harmonics generating (HHG);
   d) a XUV spectrometer located within the vacuum chamber, the XUV spectrometer configured to spectrally resolve one of an attosecond signal beam and a high harmonic signal beam that is transmitted through a sample located within the vacuum chamber between the HHG medium and an entrance slit of the XUV spectrometer; and
   e) a two dimensional imager configured to detect HHG radiation;
wherein the XUV spectrometer comprises a XUV flat-field grazing incidence grating.

2. The system of claim 1 adapted for performing four dimensional multicolor nanotomography with high harmonics and attosecond pulses to attain spectrally resolved absorption and index of refraction data about the three-dimensional volumetric structure of a sample, the system additionally comprising:
   a) a beamsplitter that divides the driving beam into a reference beam and a signal beam; and
   b) a compensation glass plate through which the reference beam passes;

wherein the focusing optics are configured to focus both the reference and signal beams into the high harmonics generating (HHG) medium; and the XUV spectrometer is configured to spectrally and spatially resolve in the far-field one of an attosecond signal beam and a high harmonic signal beam that is transmitted through a sample located within the vacuum chamber between the HHG medium and an entrance slit of the XUV spectrometer and one of an attosecond reference beam and a high harmonic reference beam that doesn't interact with the sample.

3. The system of claim 2 adapted to perform five dimensional multicolor nanotomography with high harmonics and attosecond pulses to obtain spectrally resolved absorption and index of refraction data about the three-dimensional volumetric structure and temporal dynamics of the sample, the system additionally comprising:
 a) beamsplitter configured to divide the driving beam into a pump beam and a probe beam;
 b) a delay line configured to control the time between the pump beam and the probe beam; and
 c) delivery optics configured to direct the pump beam into the measured sample.

4. The system of claim 1 adapted to perform five dimensional multicolor nanotomography with high harmonics and attosecond pulses to obtain spectrally resolved absorption data about the three-dimensional volumetric structure and temporal dynamics of the sample, the system additionally comprising:
 a) a beamsplitter configured to divide the driving beam into a pump beam and a probe beam;
 b) a delay line configured to control the time between the pump beam and the probe beam; and
 c) delivery optics configured to direct the pump beam into the measured sample.

5. The system of claim 4 comprising a nonlinear medium within which the pump wavelength is changed.

6. The system of claim 5 comprising a beta barium borate (BBO) crystal that doubles the wavelength.

7. The system of claim 1 adapted to perform Fourier-domain Optical Coherence Tomography, the system additionally comprising a folding mirror that is configured to allow the harmonic signal beam to be reflected from the sample before being focused on the entrance slit of the XUV spectrometer.

8. The system of claim 1 wherein the two dimensional imager is comprised of one of:
 a) a microchannel plate on which the signal and reference beams fall after being diffracted by a grating in the XUV spectrometer and focusing optics configured to image the backside phosphor screen of the microchannel plate onto a CCD camera or CMOS camera;
 b) an XUV CCD camera; and
 c) a phosphor screen on which the signal and reference beams fall after being diffracted by a grating in the XUV spectrometer and focusing optics configured to image the phosphor screen onto a CCD camera or CMOS camera.

9. The system of claim 1 wherein the sample is one of: a nanostructure, an electronic chip, or a biological target.

10. The system of claim 1 comprising a stage on which the sample is mounted, the stage configured to move the sample in the plane perpendicular to the beam propagation and also to rotate the sample.

11. The system of claim 1 wherein the driving source for harmonic generation is one of: an 800-nm driving laser and an optical parametric amplifier (OPA).

12. The system of claim 11 wherein the OPA has a central wavelength of up to 2600 nm.

13. The system of claim 1 wherein the high harmonics generating medium is one of: gas jets, semi-infinite gas cells, gas-filled hollow waveguides with a quasiphase-matched arrangement, and gas-filled hollow waveguides without a quasiphase-matched arrangement.

14. The system of claim 1 wherein the probe beam is spectrally broadened in a hollow fiber filled with neon and dispersion compensated with chirped mirrors.

15. A method for performing four dimensional multicolor nanotomography with high harmonics and attosecond pulses to attain absorption data about the three-dimensional volumetric structure of a sample, the method comprising:
 a) activating a driving source to produce a driving beam of femtosecond laser pulses;
 b) focusing the driving beam into a high harmonics generating (HHG) medium wherein one of: a) attosecond pulses and b) high harmonic pulses are generated;
 c) focusing one of an attosecond signal beam and a high harmonic signal beam that is transmitted through the sample on an entrance slit of a XUV spectrometer;
 d) spectrally resolving with the XUV spectrometer a diffraction pattern of one of the attosecond signal beam and the high harmonic signal beam that is transmitted through the sample; and
 e) directing the signal beam, after being diffracted by a grating in the XUV spectrometer, onto a two dimensional imager configured to detect HHG radiation;
 wherein the XUV spectrometer comprises a XUV flat-field grazing incidence grating; and
 A. if the sample has cylindrical symmetry:
  i) mounting the sample on a stage that is configured to move the sample in the plane perpendicular to the beam propagation;
  ii) scanning the sample in the plane perpendicular to the beam propagation direction and collecting the data; and
 B. if the sample does not have cylindrical symmetry:
  i) mounting the sample on a stage that is configured to move the sample in the plane perpendicular to the beam propagation and also to rotate the sample;
  ii) rotating the sample;
  iii) for each rotational position, scanning the sample in the plane perpendicular to the beam propagation direction and collecting the data.

16. The method of claim 15 adapted for performing four dimensional multicolor nanotomography with high harmonics and attosecond pulses to attain absorption and index of refraction data about the three-dimensional volumetric structure of a sample, the method additionally comprising:
 i) dividing with a beamsplitter the driving beam into reference and signal beams;
 ii) passing the reference beam through a compensation plate;
 iii) replacing steps b) through e) with the following steps:
  f) focusing both the reference beam and signal beam into a high harmonics generating (HHG) medium wherein one of: a) attosecond pulses and b) high harmonic pulses are generated;
  g) focusing on an entrance slit of a XUV spectrometer
   i) one of: a) an attosecond signal beam and b) a high harmonic signal beam that is transmitted through the sample; and ii) one of: a) an attosecond reference beam and b) a high harmonic reference beam that does not interact with the sample;

h) spectrally and spatially resolving with the XUV spectrometer in the far-field a diffraction pattern of
   i) one of: a) the attosecond signal beam and b) the high harmonic signal beam that is transmitted through the sample; and
   ii) one of: a) the attosecond reference beam and b) the high harmonic reference beam that does not interact with the sample;

i) directing the coherently superimposed signal and reference beams after being diffracted by a grating in the XUV spectrometer onto a two dimensional imager configured to detect HHG radiation.

17. The method of claim 16 adapted for performing five dimensional multicolor nanotomography with high harmonics and attosecond pulses to obtain absorption and index of refraction data about the three-dimensional volumetric structure and dynamics of the sample and allowing the interplay of phonons, carriers, and magnetic moment dynamics in the sample to be measured allowing visualization of temporal processes taking place in the sample, the method additionally comprising performing the following steps after step a):
   x) dividing the driving beam with a beamsplitter into a pump beam and a probe beam;
   y) controlling the time between the pump beam and the probe beam with a delay line; and
   z) directing with delivery optics the pump beam onto the sample inside the vacuum chamber.

18. The method of claim 16 for full characterization of the phase and amplitude of the wavefront of spectrally resolved reference and signal beams by using the Spectral Wavefront Optics Reconstruction by Diffraction (SWORD) method, the SWORD method comprising:
   a) producing XUV radiation in generating medium;
   b) diffracting the XUV radiation through a horizontal scanning slit;
   c) directing the XUV radiation that has passed through the horizontal scanning slit to impinge onto the entrance slit of an XUV spectrometer, wherein the XUV spectrometer is constructed to resolve the spectrum in one direction (horizontal) and to allow essentially free-space field propagation in the other (vertical);
   d) directing a vertically diffracted sample of the incoming wavefront to pass through an entrance slit of the XUV spectrometer;
   e) taking two dimensional images for each position of the scanning slit, thereby producing a diffractogram; and
   f) determining the wavefront slope of the sampled wavefront slice, which is proportional to the relative vertical position of the diffraction pattern's centroid, thereby reconstructing the waveform by analyzing the measured diffractogram, wherein the amplitude at each sampling point is determined by the integral intensity of the corresponding diffraction pattern in the diffractogram.

19. The method of claim 16 for recording of a spectral hologram of a spectrally resolved diffraction pattern of the reference beam superimposed with a spectrally resolved diffraction pattern of the signal beam on the two dimensional imager, wherein the spectral hologram is express as:

$$I(\vec{r}_{mcp}, \omega) = \||E_s(\vec{r}_{mcp}, \omega)|\exp[-i\phi_s(\vec{r}_{mcp}, \omega)] +$$
$$|E_r(\vec{r}_{mcp}, \omega)|\exp[-i\phi_r(\vec{r}_{mcp}, \omega)]\|^2$$
$$= |E_s(\vec{r}_{mcp}, \omega)|^2 + |E_s(\vec{r}_{mcp}, \omega)|^2 +$$
$$2|E_s(\vec{r}_{mcp}, \omega)E_r(\vec{r}_{mcp}, \omega)|\cos[\phi_s(\vec{r}_{mcp}, \omega) -$$
$$\phi_r(\vec{r}_{mcp}, \omega)].$$

20. The method of claim 19 for determining the complete reconstruction of the phase and amplitude for each spectral component of the signal beam diffracted from the sample in the two dimensional imager plane, the method comprising:
   a) determining the full characterization of the reference beam;
   b) measuring the spectral hologram;
   c) using the full characterization of the reference beam and the spectral hologram to carry out a reconstruction process used in computed holography.

21. The method of claim 16 wherein the resolution is increased and both phase and amplitude are measured next to the sample by using the Fresnel-Kirchhoff diffraction formula to computationally back propagate the spectrally resolved harmonic signal beam onto the sample.

22. The method of claim 16 in which a Radon transform is applied separately to the absorption data and to the phase data for each color, thereby facilitating three dimensional spatial and one dimensional spectral reconstruction of both absorption and index of refraction of the sample.

23. The method of claim 15 adapted for performing five dimensional multicolor nanotomography with high harmonics and attosecond pulses to obtain absorption data about the three-dimensional volumetric structure and dynamics of the sample and allowing the interplay of phonons, carriers, and magnetic moment dynamics in the sample to be measured allowing visualization of temporal processes taking place in the sample, the method additionally comprising performing the following steps after step a):
   x) dividing the driving beam with a beamsplitter into a pump beam and a probe beam;
   y) controlling the time between the pump beam and the probe beam with a delay line; and
   z) directing with delivery optics the pump beam onto the sample inside the vacuum chamber.

24. The method of claim 23 wherein the pump wavelength is changed by a nonlinear medium.

25. The method of claim 15 adapted to perform Fourier-domain Optical Coherence Tomography, the adapted method comprising reflecting the harmonic signal beam from the sample before focusing the harmonic signal beam on the entrance slit of the XUV spectrometer.

26. The method of claim 15 in which a Radon transform is applied separately to the absorption data for each color, thereby facilitating three dimensional spatial and one dimensional spectral reconstruction of absorption and index of refraction of the sample.

* * * * *